US012336956B2

(12) United States Patent
Pham et al.

(10) Patent No.: US 12,336,956 B2
(45) Date of Patent: Jun. 24, 2025

(54) AUTONOMOUS VEHICLE WITH AUDIO USER GUIDANCE

(71) Applicant: Motional AD LLC, Boston, MA (US)

(72) Inventors: Linh Pham, Boston, MA (US); Adam Ridgely Khaw, Boston, MA (US); Christopher Konopka, Boston, MA (US)

(73) Assignee: Motional AD LLC, Boston, MA (US)

( * ) Notice: Subject to any disclaimer, the term of this patent is extended or adjusted under 35 U.S.C. 154(b) by 97 days.

(21) Appl. No.: 18/145,128

(22) Filed: Dec. 22, 2022

(65) Prior Publication Data

US 2024/0122780 A1 Apr. 18, 2024

Related U.S. Application Data

(60) Provisional application No. 63/416,227, filed on Oct. 14, 2022.

(51) Int. Cl.
*A61H 3/06* (2006.01)

(52) U.S. Cl.
CPC ....... *A61H 3/061* (2013.01); *A61H 2201/501* (2013.01); *A61H 2201/5028* (2013.01); *A61H 2201/5048* (2013.01); *A61H 2201/5064* (2013.01); *A61H 2201/5097* (2013.01)

(58) Field of Classification Search
CPC .............. A61H 3/061; A61H 2201/501; A61H 2201/5028; A61H 2201/5048; A61H 2201/5064; A61H 2201/5097
See application file for complete search history.

(56) References Cited

U.S. PATENT DOCUMENTS

| | | | | |
|---|---|---|---|---|
| 10,665,155 B1 * | 5/2020 | Rao | ........................ | B60K 35/28 |
| 2017/0316696 A1 * | 11/2017 | Bartel | .................... | B60K 28/06 |
| 2018/0004215 A1 | 1/2018 | Miller et al. | | |
| 2019/0107840 A1 | 4/2019 | Green et al. | | |
| 2020/0110414 A1 | 4/2020 | Dupre et al. | | |

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.
International Search Report and Written Opinion received for PCT Patent Application No. PCT/US2023/076708, mailed on Feb. 1, 2024.

* cited by examiner

*Primary Examiner* — Rodney A Butler
(74) *Attorney, Agent, or Firm* — Knobbe, Martens, Olson & Bear, LLP

(57) ABSTRACT

Provided are methods for autonomous vehicle and audio user guidance, which can include detecting user input at a first surface, determining context data associated with a feature of the first surface and providing an instruction associated with the context data. Systems and computer program products are also provided.

15 Claims, 12 Drawing Sheets

500

500

AUTONOMOUS VEHICLE WITH AUDIO USER GUIDANCE

CROSS-REFERENCE TO RELATED APPLICATIONS

The present application claims priority/benefit from U.S. Provisional Application No. 63/416,227, filed on Oct. 14, 2022, entitled "AUTONOMOUS VEHICLE WITH AUDIO USER GUIDANCE," which is herein incorporated by reference in its entirety.

BACKGROUND

It is common for people suffering with visual impairment, such as blind people, to use tactile feedback to acquire information indicative of a vehicle which they may plan on entering. It can be difficult and time consuming to accurately determine information about a vehicle using tactile feedback, especially if the surface is unfamiliar. As a result, people suffering with visual impairment can experience difficulty entering and exiting vehicles, such as autonomous vehicles (AVs).

DETAILED DESCRIPTION

Figure 1:
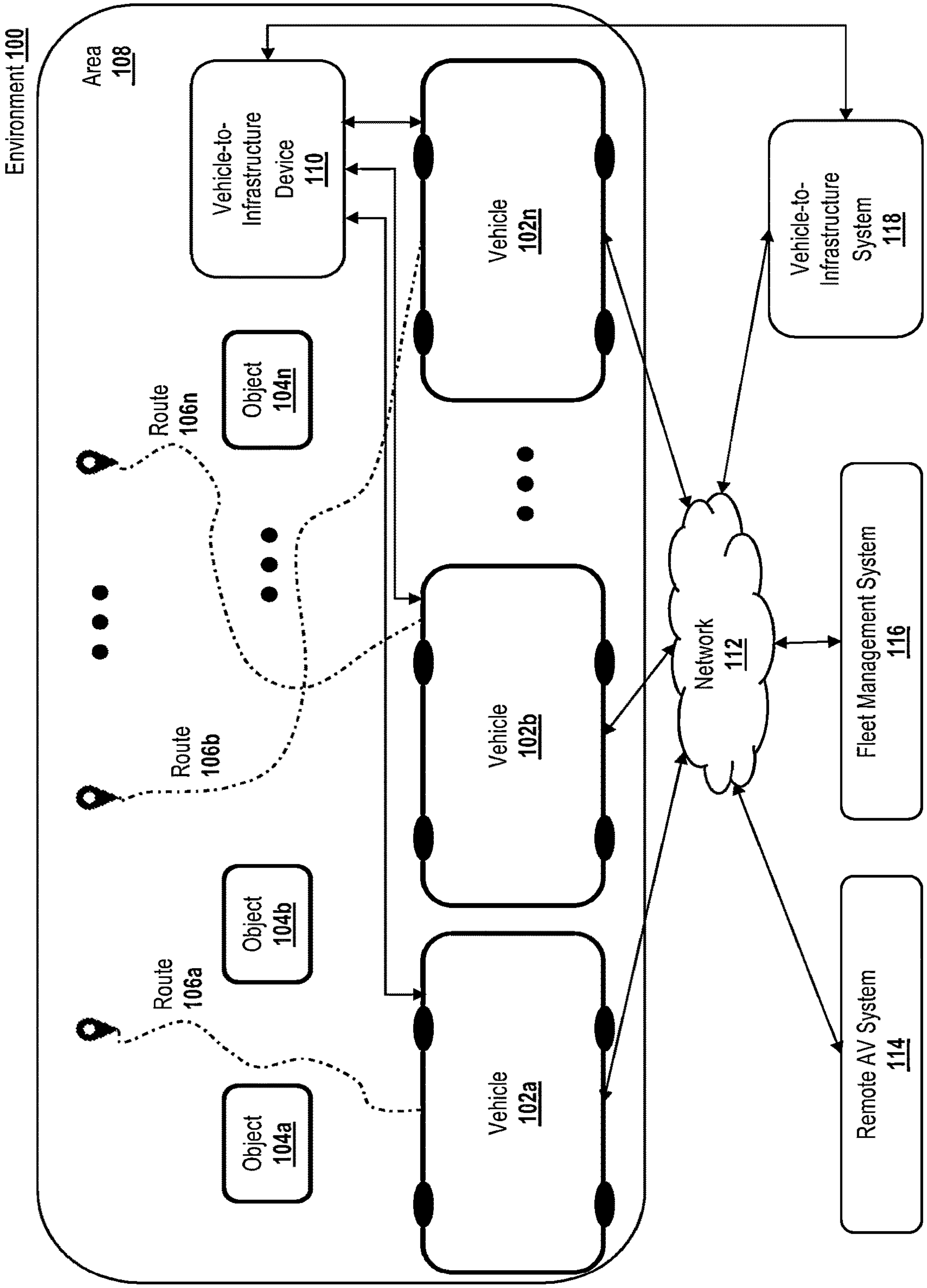
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

"At least one," and "one or more" includes a function being performed by one element, a function being performed by more than one element, e.g., in a distributed fashion, several functions being performed by one element, several functions being performed by several elements, or any combination of the above."

Some embodiments of the present disclosure are described herein in connection with a threshold. As described herein, satisfying, such as meeting, a threshold can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement detecting a user input at or on a surface of an autonomous vehicle, and responding to the detection of the user input via one or more actions determined from contextual data associated with the surface.

By virtue of the implementation of systems, methods, and computer program products described herein, techniques for autonomous vehicle and audio user guidance enable a vehicle, such as an autonomous vehicle, to determine the position of a user, such as a visually impaired user, and provide to the user output indicative of the position of the user. This output could be used to help the pedestrian safely navigate to an entrance or exit point of the vehicle, such as a door on the opposite side of the vehicle to the pedestrian. This enables faster (e.g., time-efficient) and safer entrance and exit of pedestrians to and from the vehicle. Additionally, by enabling the pedestrian to enter and exit the vehicle faster, resources consumed during operation of the vehicle, such as resources consumed when powering the vehicle and/or resources consumed in monitoring the environment while waiting for the individual to enter or exit, can be conserved.

Referring now to FIG. 1, illustrated is example environment 100 in which vehicles that include autonomous systems, as well as vehicles that do not, are operated. As illustrated, environment 100 includes vehicles 102*a*-102*n*, objects 104*a*-104*n*, routes 106*a*-106*n*, area 108, vehicle-to-infrastructure (V2I) device 110, network 112, remote autonomous vehicle (AV) system 114, fleet management system 116, and V2I system 118. Vehicles 102*a*-102*n*, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104*a*-104*n* interconnect with at least one of vehicles 102*a*-102*n*, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102*a*-102*n* (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106*a*-106*n* (referred to individually as route 106 and collectively as routes 106), as described herein. In some embodiments, one or more vehicles 102 include an autonomous system (e.g., an autonomous system that is the same as or similar to autonomous system 202).

Objects 104*a*-104*n* (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106*a*-106*n* (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

Figure 6:
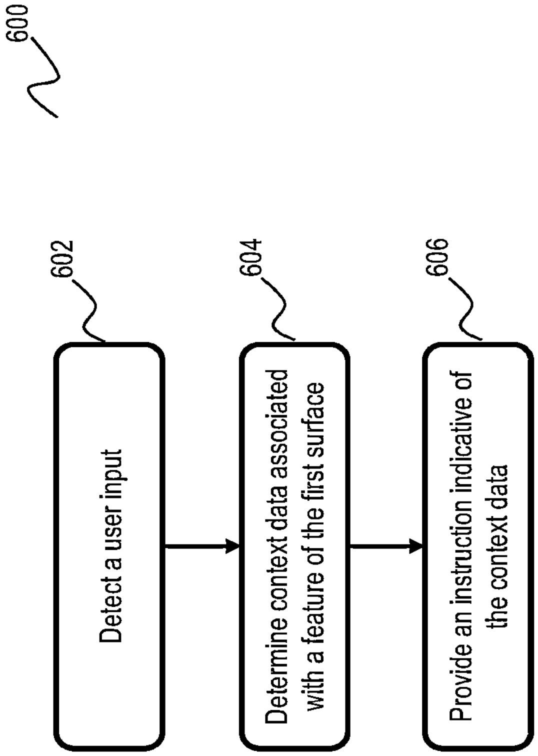
FIG. 6 is a flowchart of an example process for autonomous vehicle and audio user guidance.

In some embodiments, device 300 is configured to execute software instructions of one or more steps of the disclosed method, as illustrated in FIG. 6.

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
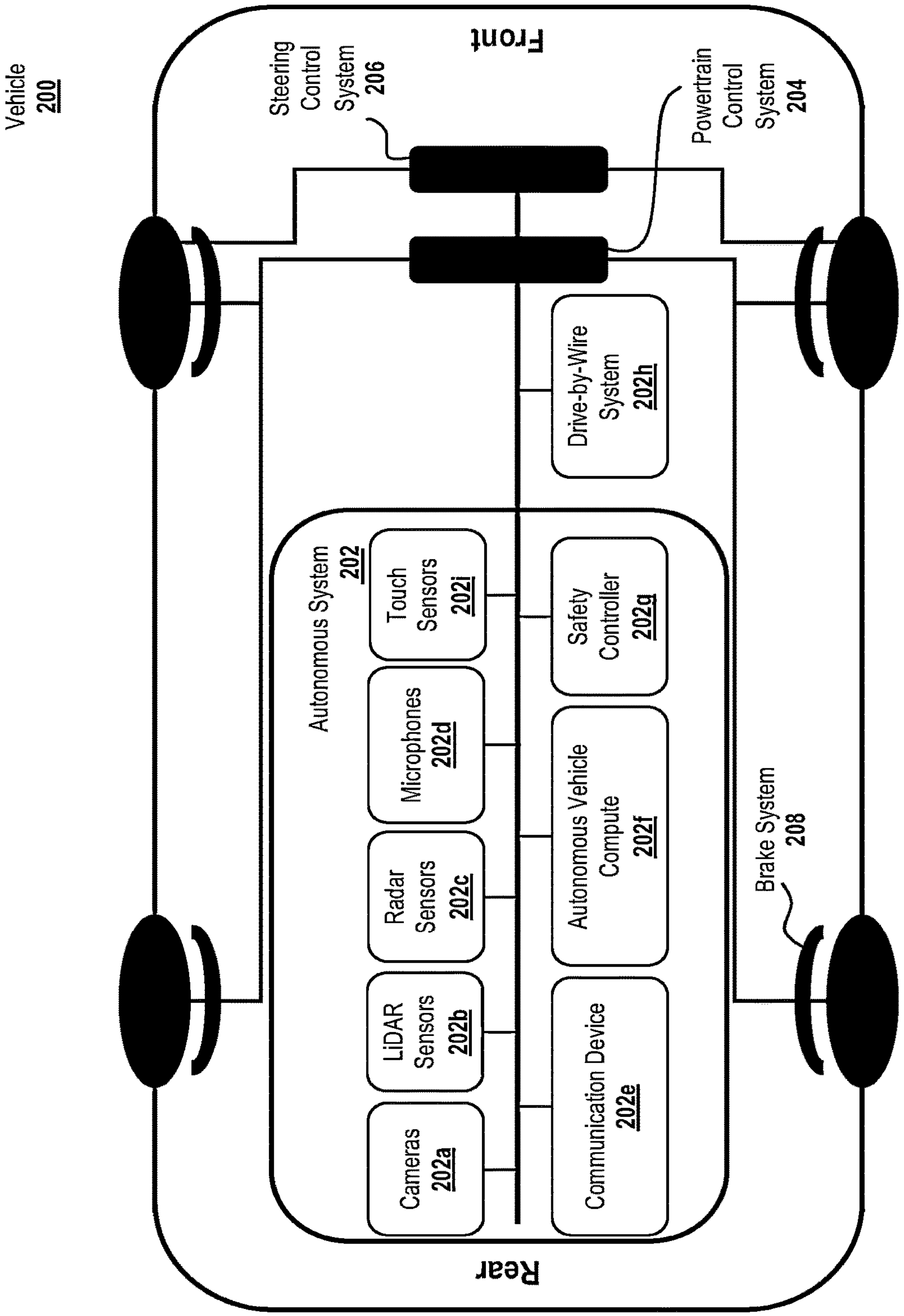
FIG. 2 is a diagram of one or more example systems of a vehicle including an autonomous system.

Referring now to FIG. 2, vehicle 200 (which may be the same as, or similar to vehicle 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features.

Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202*a*, LiDAR sensors 202*b*, radar sensors 202*c*, and microphones 202*d*. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202*e*, autonomous vehicle compute 202*f*, drive-by-wire (DBW) system 202*h*, and safety controller 202*g*.

Figure 3:
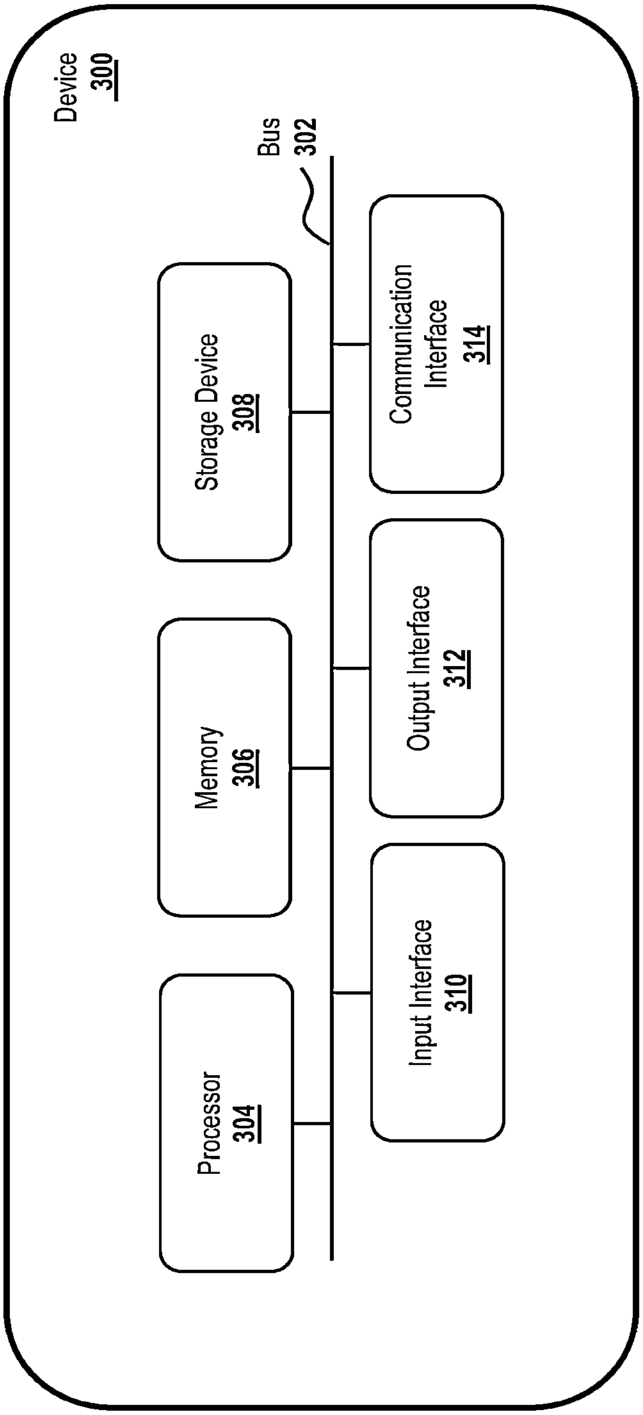
FIG. 3 is a diagram of components of one or more example devices and/or one or more example systems of FIGS. 1 and 2.

Cameras 202*a* include at least one device configured to be in communication with communication device 202*e*, autonomous vehicle compute 202*f*, and/or safety controller 202*g* via a bus (e.g., a bus that is the same as or similar to bus 302 of FIG. 3). Cameras 202*a* include at least one camera (e.g., a digital camera using a light sensor such as a Charge-Coupled Device (CCD), a thermal camera, an infrared (IR) camera, an event camera, and/or the like) to capture images including physical objects (e.g., cars, buses, curbs, people, and/or the like). In some embodiments, camera 202*a* generates camera data as output. In some examples, camera 202*a* generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202*a* includes a plurality of independent cameras configured on (e.g., positioned on) a vehicle to capture images for the purpose of stereopsis (stereo vision). In some examples, camera 202*a* includes a plurality of cameras that generate image data and transmit the image data to autonomous vehicle compute 202*f* and/or a fleet management system (e.g., a fleet management system that is the same as or similar to fleet management system 116 of FIG. 1). In such an example, autonomous vehicle compute 202*f* determines depth to one or more objects in a field of view of at least two cameras of the plurality of cameras based on the image data from the at least two cameras. In some embodiments, cameras 202*a* is configured to capture images of objects within a distance from cameras 202*a* (e.g., up to 100 meters, up to a kilometer, and/or the like). Accordingly, cameras 202*a* include features such as sensors and lenses that are optimized for perceiving objects that are at one or more distances from cameras 202*a*.

In an embodiment, camera 202*a* includes at least one camera configured to capture one or more images associated with one or more traffic lights, street signs and/or other physical objects that provide visual navigation information. In some embodiments, camera 202*a* generates traffic light data associated with one or more images. In some examples, camera 202*a* generates TLD (Traffic Light Detection) data associated with one or more images that include a format (e.g., RAW, JPEG, PNG, and/or the like). In some embodiments, camera 202*a* that generates TLD data differs from other systems described herein incorporating cameras in that camera 202*a* can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202*b* include at least one device configured to be in communication with communication device 202*e*, autonomous vehicle compute 202*f*, and/or safety controller 202*g* via a bus (e.g., a bus that is the same as or similar to bus 302 of FIG. 3). LiDAR sensors 202*b* include a system configured to transmit light from a light emitter (e.g., a laser transmitter). Light emitted by LiDAR sensors 202*b* include light (e.g., infrared light and/or the like) that is outside of the visible spectrum. In some embodiments, during operation, light emitted by LiDAR sensors 202*b* encounters a physical object (e.g., a vehicle) and is reflected back to LiDAR sensors 202*b*. In some embodiments, the light emitted by LiDAR sensors 202*b* does not penetrate the physical objects that the light encounters. LiDAR sensors 202*b* also include at least one light detector which detects the light that was emitted from the light emitter after the light encounters a physical object. In some embodiments, at least one data processing system associated with LiDAR sensors 202*b* generates an image (e.g., a point cloud, a combined point cloud, and/or the like) representing the objects included in a field of view of LiDAR sensors 202*b*. In some examples, the at least one data processing system associated with LiDAR sensor 202*b* generates an image that represents the boundaries of a physical object, the surfaces (e.g., the topology of the surfaces) of the physical object, and/or the like. In such an example, the image is used to determine the boundaries of physical objects in the field of view of LiDAR sensors 202*b*.

Radio Detection and Ranging (radar) sensors 202*c* include at least one device configured to be in communication with communication device 202*e*, autonomous vehicle compute 202*f*, and/or safety controller 202*g* via a bus (e.g., a bus that is the same as or similar to bus 302 of FIG. 3). Radar sensors 202*c* include a system configured to transmit radio waves (either pulsed or continuously). The radio waves transmitted by radar sensors 202*c* include radio waves that are within a predetermined spectrum In some embodiments, during operation, radio waves transmitted by radar sensors 202*c* encounter a physical object and are reflected back to radar sensors 202*c*. In some embodiments, the radio waves transmitted by radar sensors 202*c* are not reflected by some objects. In some embodiments, at least one data processing system associated with radar sensors 202*c* generates signals representing the objects included in a field of view of radar sensors 202*c*. For example, the at least one data processing system associated with radar sensor 202*c* generates an image that represents the boundaries of a physical object, the surfaces (e.g., the topology of the surfaces) of the physical object, and/or the like. In some examples, the image is used to determine the boundaries of physical objects in the field of view of radar sensors 202*c*.

Microphones 202*d* includes at least one device configured to be in communication with communication device 202*e*, autonomous vehicle compute 202*f*, and/or safety controller 202*g* via a bus (e.g., a bus that is the same as or similar to bus 302 of FIG. 3). Microphones 202*d* include one or more microphones (e.g., array microphones, external microphones, and/or the like) that capture audio signals and generate data associated with (e.g., representing) the audio signals. In some examples, microphones 202*d* include transducer devices and/or like devices. In some embodiments, one or more systems described herein can receive the data generated by microphones 202*d* and determine a position of an object relative to vehicle 200 (e.g., a distance and/or the like) based on the audio signals associated with the data.

Communication device 202*e* includes at least one device configured to be in communication with cameras 202*a*, LiDAR sensors 202*b*, radar sensors 202*c*, microphones 202*d*, autonomous vehicle compute 202*f*, safety controller 202*g*, and/or DBW (Drive-By-Wire) system 202*h*. For example, communication device 202*e* may include a device that is the same as or similar to communication interface 314 of FIG. 3. In some embodiments, communication device 202*e* includes a vehicle-to-vehicle (V2V) communication device (e.g., a device that enables wireless communication of data between vehicles).

Autonomous vehicle compute 202*f* include at least one device configured to be in communication with cameras 202*a*, LiDAR sensors 202*b*, radar sensors 202*c*, microphones 202*d*, communication device 202*e*, safety controller 202*g*, and/or DBW system 202*h*. In some examples, autonomous vehicle compute 202*f* includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202*f* is the same as or similar to autonomous vehicle compute 400, described herein. Additionally, or alternatively, in some embodiments autonomous vehicle compute 202*f* is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202*g* includes at least one device configured to be in communication with cameras 202*a*, LiDAR sensors 202*b*, radar sensors 202*c*, microphones 202*d*, communication device 202*e*, autonomous vehicle computer 202*f*, and/or DBW system 202*h*. In some examples, safety controller 202*g* includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202*g* is configured to generate control signals that take precedence over (e.g., overrides) control signals generated and/or transmitted by autonomous vehicle compute 202*f*.

DBW system 202*h* includes at least one device configured to be in communication with communication device 202*e* and/or autonomous vehicle compute 202*f*. In some examples, DBW system 202*h* includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202*h* are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202*h*. In some examples, powertrain control system 204 includes at least one controller, actuator, and/or the like. In some embodiments, powertrain control system 204 receives control signals from DBW system 202*h* and powertrain control system 204 causes vehicle 200 make longitudinal vehicle motion, such as to start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate. In other words, steering control system 206 causes activities necessary for the regulation of the y-axis component of vehicle motion.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of remote AV system 114, fleet management system 116, V2I system 118, and/or one or more devices of network 112 (e.g., one or more devices of a system of network 112). In some embodiments, one or more devices of vehicles 102 (e.g., one or more devices of a system of vehicles 102 such as at least one device of remote AV system 114, fleet management system 116, and V2I system 118, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.*u*

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
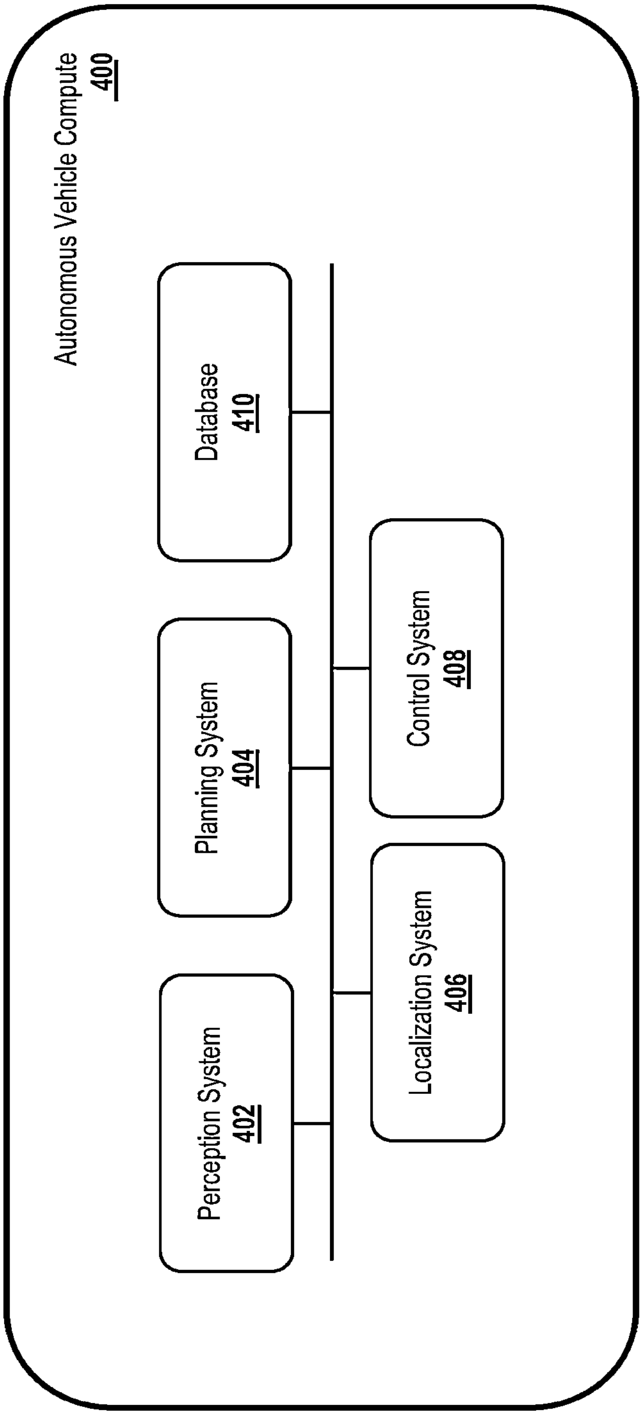
FIG. 4 is a diagram of certain components of an example autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute **202*f* of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118**, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202*a*), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202*b*). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202*h*, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202*b*) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Referring now to FIGS. 5A-5G, illustrated are diagrams of an implementation of a system 500 for autonomous vehicle 502 and audio user guidance. In one or more embodiments or examples, system 500 is in communication with and/or a part of an AV (e.g., such as Autonomous System 202 illustrated in FIG. 2, device 300 of FIG. 3), an AV system, an AV compute (such as AV compute 202*f* of FIG. 2 and/or AV compute 400 of FIG. 4), a remote AV system (such as remote AV system 114 of FIG. 1), a fleet management system (such as fleet management system 116 of FIG. 1), and a V2I system (such as V2I system 118 of FIG. 1). In one or more examples, the system 500 can be for operating an autonomous vehicle.

In one or more embodiments or examples, the system 500 is in communication with one or more of: a device (such as device 300 of FIG. 3), a perception system (such as the perception system 402 of FIG. 4), an input interface (such as input interface 310 of FIG. 3), an output interface (such as output interface 312 of FIG. 3), and a communication interface (such as communication interface 314 of FIG. 3).

Disclosed herein is a system 500 (e.g., having at least one processor and at least one non-transitory computer readable medium storing instructions that, when executed by at least one processor, cause the at least one processor to perform operations). The system 500 is configured for detecting a user input at or on a first surface of an autonomous vehicle 502 using a first sensor. In accordance with a detection of the user input at or on the first surface, the system is configured to determine context data associated with a feature of the first surface, also denoted first context data, and providing an instruction associated with the context data via an interface.

In other words, the present disclosure relates to systems, methods, and computer program products that provide an AV with audible user guidance to a pedestrian/user (e.g., during entry and/or exit of an AV), for example with an audible user feedback on a pedestrian's/user's interaction with an AV. Thus, people that are blind or have low vision and having demand for ride-hailing and taxi services may be assisted in navigating entry and/or exit of the AV in accordance with the user touching or being close to one or more surfaces of the AV.

In one or more examples or embodiments, the system 500 is configured to receive (or receive) the user input performed by the user 506, such as shown in FIGS. 5B-G, on surface 508 (e.g., first surface). In some examples, the user input includes the user 506 touching or contacting surface 508 of the autonomous vehicle 502, and the system 500 receives and detects the user input of the user 506 touching the surface 508 of the autonomous vehicle 502. In one or more embodiments or examples, the user input includes direct contact between the skin of the user 506 and the first surface. In some examples, the system 500 is configured to detect user input with one or more layers of clothing covering the skin of the user 506. For example, the first sensor detects the user input even if the user 506 touches the first surface through an item of clothing, e.g., gloves, a sleeve, a scarf, etc. In some examples, the user input includes the user 506 performing a gesture, for example, without touching the first surface. The user input is any sort of physical interaction between the user and the vehicle, for example. In some embodiments, the system 500 detects the user input by a sensor (e.g. a touch sensor, capacitance sensor, and/or a proximity sensor, such as touch sensor 202*i*, cameras 202*a*, LiDAR sensors 202*b*, radar sensors 202*c*, and microphones 202*d* of FIG. 2) located on/in the autonomous vehicle 502.

In one or more embodiments or examples, the surface 508 is an outer surface and/or an inner surface of the autonomous vehicle 502. In one or more embodiments or examples, the surface 508 is a conductive surface. In some embodiments, the surface 508 includes a coating, such as an electronically insulating coating. In one or more embodiments or examples, the surface 508 is embedded with at least one or more touch sensors, e.g. impedance sensor, capacitive sensor and/or resistive sensor. In some embodiments, the surface 508 is defined as the surface with which the user 506 is interacting at any given moment. The surface 508 can be any physical surface of the autonomous vehicle 502, such as including coatings, parts, mirrors, etc., as also described in further detail below.

Figure 5A:
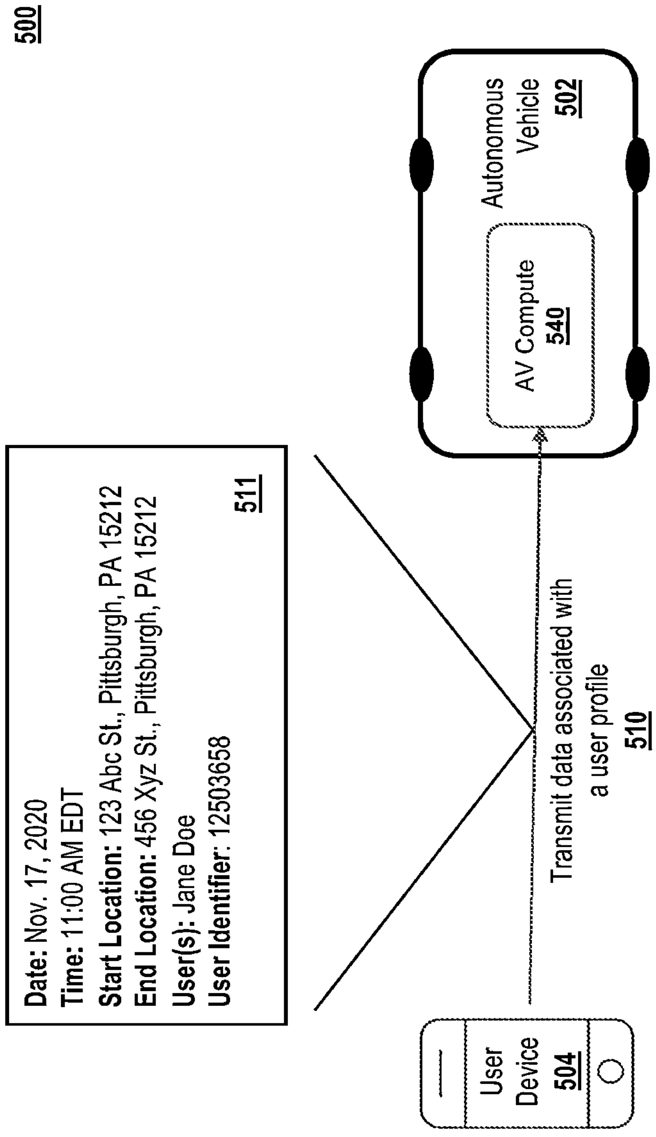
FIGS. 5A-5G are diagrams of an example implementation of a process for autonomous vehicle and audio user guidance.

In some examples, the system 500 is configured to determine context data upon receiving user input. Context data can be associated with an identification of the surface 508 and/or a user instruction, such as a user instruction associated with the surface 508. In some embodiments, context data is used to determine instructions to be provided by the system 500. For example, context data is indicative of information relating to how the user 506 should enter and/or exit the autonomous vehicle 502, such as shown in FIG. 5C. In some examples, the context data is provided by the autonomous vehicle compute 540. For example, the context data associated with a feature of the surface 508 is associated with a context data identifier. In some examples, the context data identifier is indicative of relevant audio data, and therefore used to select the instruction provided to the user 506. In other words, the touch or gesture may be mapped to audio to be played to the user 506. For example, the context data includes information that can be presented to a user 506 from the autonomous vehicle 502.

In one or more embodiments or examples, a feature of the surface 508 is any information relating to the surface 508. In some examples, the feature of the surface 508 is associated with the shape, function and/or location of the surface 508. For example, if the surface 508 is the door handle, the feature of the surface 508 is that the surface 508 is a door handle. In some examples, the feature of the surface 508 is indicative of the location of a second surface and/or second feature.

In one or more embodiments or examples, providing an instruction associated with the context data includes one or more of transmitting and playing audio to the user 506. In one or more embodiments or examples, the instruction is provided to the user 506 by the autonomous vehicle 502 and/or the user device 504. In some examples, the autonomous vehicle 502 is configured to transmit the instruction to the user device 504. In some examples, the instruction is provided to the user 506 as an audio signal, e.g. via a loudspeaker (e.g., internal or external loudspeaker). In some examples, the instruction is provided through headphones, earpiece, or earphones connected to the user device 504 and/or the autonomous vehicle 502 and worn by the user 506. This can assist the user 506 in hearing the instruction more clearly. Further, noise pollution generated by loudspeakers can be avoided.

In some examples, the instruction includes information describing how to enter and/or exit the autonomous vehicle 502. For example, the instructions include directional information. As an example, the system 500 is configured to, when detecting that the user 506 is touching the surface 508 near a door handle, output directional information to the user 506 indicating which direction the user 506 should move to touch the door handle (e.g. "move up and left for the door handle"). In some examples, the system 500 is configured to provide information indicative of the surroundings of the first surface in the instruction provided to the user 506. As an example, the system 500 is configured to provide an instruction informing the user 506 of the location of physical buttons for operating a digital display inside of the autonomous vehicle 502, such as shown in FIG. 5G. In some examples, the instruction provided by the system 500 are based on sensor data from at least one or more sensors. For example, if the external sensors detect incoming traffic, the instruction provides a warning of this (and any other dangers detected by the autonomous vehicle 502 that the user 506 may not be aware of), thereby improving the safety of the user 506.

In one or more embodiments or examples, in accordance with the detection of the user input at or on the surface 508, the system is configured to determine context data associated with a feature of a second surface, also denoted second context data. In one or more embodiments or examples, the second surface is a surface adjacent to the surface 508. For example and as illustrated in FIG. 5D, when the rear left side panel is the surface 508 (e.g., first surface), the second surface is the front left door. In one or more embodiments or examples, the second surface includes surface 508 as shown in FIGS. 5B-5G. In some examples, the second surface is an outer surface of the autonomous vehicle 502. The second surface can be the same and/or similar to the surface 508 discussed above.

In one or more embodiments or examples, the context data associated with a feature of the surface 508 and/or second surface is a user guidance scheme indicative of user guidance associated with the user input at or on the surface 508. In one or more embodiments or examples, the user guidance scheme includes information indicative of the instruction to be provided for the user 506. In one or more embodiments or examples, the user guidance scheme includes information associated with one or more different instructions for the surface 508. In some examples, the user guidance scheme includes the user guidance. In one or more embodiments or examples, the user guidance scheme is customizable for each user, such as associated with a user profile 511. In some examples, the user guidance scheme includes information indicative of how to enter and/or exit the vehicle 502. In one or more embodiments or examples, the user guidance includes providing the instruction associated with context data. In some examples, the user guidance is based on the operating status of the autonomous vehicle 502. In other words, the user guidance scheme can act as a database for or define different instructions which can be provided for the same surface. For example, the user guidance scheme is indicative of an instruction for when the vehicle 502 is locked and unlocked. For example, in a scenario where the user touches the door handle when the vehicle 502 is locked, a different instruction can be retrieved from the user guidance scheme and provided compared to when the vehicle 502 is unlocked, e.g. "Unlock the car, then pull the handle to enter the vehicle", vs just "pull the handle to enter the car." In one or more examples or embodiments, the system 500 is configured such that the user guidance includes an instruction provided by the autonomous vehicle 502.

In one or more embodiments or examples, the system 500 is configured to obtain a user profile 511. In one or more embodiments or examples, the system 500 is configured to determine context data associated with a feature of the first surface by determining the user guidance scheme based on the user profile 511. In one or more embodiments or examples, the system 500 is configured so that the user 506 is able to access the user profile 511 on the user device 504. In one or more embodiments or examples, the user device 504 is configured to transmit 510 data associated with a user profile 511 from the user device 504 to the AV compute 540 as shown in FIG. 5A. In some examples, the user guidance scheme is based on the user profile 511. The data associated with a user profile 511 can include information including one or more of a user name, a user start location, and a user end location.

In one or more embodiments or examples, the user profile 511 includes one or more of a user identifier and user settings. In one or more embodiments or examples, the system 500 is configured to determine context data associated with a feature of the first surface by determining the user guidance scheme based on one or more of the user identifier and the user settings. For example, the user identifier includes information indicative of the identity of the user. In accordance with the autonomous vehicle 502 belonging to the user 506, the user identifier can be associated with information indicative of the user's 506 ownership of the autonomous vehicle 502. In some examples, the instructions provided to the user 506 will be associated with the user identifier. In some examples, a unit of data complimentary to the user identifier is stored in a database (such as database 410 of FIG. 4) of the AV compute 540. In one or more embodiments or examples, the autonomous vehicle 502 is a robotaxi and the user identifier is associated with information indicative of whether the user 506 has ordered a ride. In some examples, the user identifier is a label, an address and/or a number. For example, the user identifier is transmitted to a database where it is associated with a stored user profile.

In one or more embodiments or examples, the user profile 511 includes user settings. For example, the user settings include user preferences input by the user 506. In some embodiments, the system 500 is configured so that the user settings are able to be configured by the user 506 via the user device 504 and/or the autonomous vehicle 502. In one or more embodiments or examples, the user settings includes settings for one or more of volume, language, and/or playback speed etc., of the audio message to be modified by the user 506 by altering the user settings. In one or more embodiments or examples, the user settings include an accessibility setting of the user 506, the accessibility setting being indicative of the user's accessibility to the autonomous vehicle 502. In some examples, the accessibility setting is a toggle where the user 506 switches the audio description via touch on or off. This toggle can be accessed via the user device 504 and/or the autonomous vehicle 502. In some examples, the accessibility setting is linked to the user settings. In one or more embodiments or examples, the accessibility setting includes information indicative of whether the user 506 has access to the autonomous vehicle 502. Where the user 506 does own the autonomous vehicle 502 and/or has ordered a ride with the autonomous vehicle 502, the accessibility setting can be indicative of the user 506 having access to the autonomous vehicle 502. In some embodiments, in accordance with the accessibility setting being indicative of the user 506 having access to the autonomous vehicle 502, the autonomous vehicle 502 is configured to provide the instruction to the user 506. In some examples, where the user 506 does not own the autonomous vehicle 502 and/or hasn't ordered a ride with the autonomous vehicle 502, the accessibility setting would be indicative of the user 506 not having access to the autonomous vehicle 502 and/or to not provide the instruction to the user 506. In one or more embodiments or examples, where the user 506 does not own the autonomous vehicle 502 and/or hasn't ordered a ride with the autonomous vehicle 502, the accessibility setting is configured such that the system 500 limits physical access of the user 506 to the autonomous vehicle 502 by locking doors and/or driving away from the user 506.

In one or more embodiments or examples, the system 500 is configured to obtain the user profile from a user device associated with the user via short range communication (e.g., via the at least one interface). In some examples, short range communication includes Bluetooth and/or Near Field Communication (NFC). In one or more embodiments or examples, the autonomous vehicle 502 only provides the user 506 with an instruction based on whether a recognized short range communication signal is detected by the autonomous vehicle 502. In some examples, the instruction provided by the system 500 is a way for the user 506 to ensure they are approaching and/or touching the intended vehicle as the user 506 will only hear the instructions coming from the vehicle 502 associated with their user identifier. In some embodiments and examples, the autonomous vehicle 502 provides the user 506 with an instruction according to the user profile 511. For example, the system 500 is configured to include user information (e.g., name) in the instruction (e.g. "Welcome back (insert user name)"). In some examples, the user device 504 is periodically attempting to communicate with autonomous vehicle 502 by transmitting the short range communication signals, even when outside of detectable range.

In one or more embodiments or examples, the context data associated with a feature of the first surface includes a context data identifier indicative of context associated with the feature of the surface 508. In one or more embodiments or examples, the system 500 is configured to determine the instruction associated with the feature of the surface 608 using the AV compute 540 according to the context data identifier. In some examples, the context data identifier is a label, an address and/or a number. For example, the context data identifier us transmitted to a database and/or library where it is associated with audio data indicative of context associated with a feature of the first surface.

In one or more embodiments or examples, the surface 508 (e.g., first surface) is an outer surface of the autonomous vehicle 502 (e.g. selected from a hood surface, a trunk surface, a door surface, a door handle surface, a mirror surface, a quarter panel surface, a bumper surface, a roof surface, a roof rail surface, and a window surface). In one or more embodiments or examples, the surface 508 is an inner surface of the autonomous vehicle 502 selected from a screen surface, a seat surface, a door surface, a door handle surface, and a window surface.

In one or more embodiments or examples, the system 500 is configured to provide an instruction indicative of the context data by providing audio data associated with an audio message according to the context data associated with the feature of the first surface. In one or more embodiments or examples, the audio data is configured to cause a loudspeaker to generate an audible signal based on the audio message. In one or more embodiments or examples, the audio data is configured to cause the user device 504, such as illustrated in FIG. 5C-5E, to output the audio message either via loudspeaker of the user device 504 and/or via headset connected to the user device 504.

In one or more embodiments or examples, the system 500 is configured to determine the audio data associated with the audio message. In some embodiments, the audio data includes information indicative the context data. The audio data can be transmitted to the loudspeaker to be output as an audible signal for the user 506. In some examples, the audio data is transmitted wirelessly from the autonomous vehicle 502 to the user device 504. In one or more embodiments or examples, the audio data is one or more of the following file types: MP3, MP4, M4A, WAV, WMA, AAC, FLAC and/or 3GA.

In one or more examples or embodiments, the audio message is a speech message 512. In some examples, the audio message is a statement informing the user 506 on the area of the car they are touching and/or instruction informing the user 506 how to enter and/or exit the autonomous vehicle 502. In some examples, the audio message is an audible alert, e.g., a sequence of sound beeps or tones. The audio message is played by the user device 504 and/or the autonomous vehicle 502 in some examples. For example, the audio message includes information regarding the location, such as an address and/or street name, of the autonomous vehicle 502 and/or a direction, such as a cardinal direction, that the car is facing. In some examples, the audio message includes information indicative of the surroundings of the user 506.

In some examples, the audible signal is an audio signal that is emitted by a loudspeaker. For example, the audible signal is played by the user device 504 and/or the autonomous vehicle 502. The audio signal can be played to the user 506 via a wearable audio device, such as headphones or earphones. In some examples, the wearable audio device is connected to the user device 504 and/or the autonomous vehicle 502. In some embodiments, the audible signal is in the form of speech, which will provide the user 506 with information indicative of the feature of the first surface that they are touching.

In one or more embodiments or examples, the system 500 is configured to provide audio data associated with an audio message according to the context data associated with the feature of the first surface by providing speech data associated with a speech message 512 according to the context data associated with the feature of the surface 508. In one or more embodiments or examples, the speech data is configured to cause a loudspeaker to generate an audible signal based on the speech message 512. In one or more embodiments or examples, speech data includes a speech message 512. Speech data is, in some examples, transmitted from the autonomous vehicle 502 to the user device 504.

In some examples, the system 500 is configured to play the speech message 512 via the autonomous vehicle 502 and/or the user device 504 to the user 506 as an audible signal, such as illustrated in FIG. 5B-5G. In some examples, the system 500 is configured to enable the user 506 to modify parameters of the speech message 512 via the user device 504 and/or the autonomous vehicle 502. In some examples, the speech message 512 is a statement informing the user 506 which area of the autonomous vehicle 502 they are touching and/or gesturing to. In some embodiments, the speech message 512 includes information indicative of an outer surface of the autonomous vehicle 502, for example, a hood surface, a trunk surface, a door surface, a door handle surface, a mirror surface, a quarter panel surface, a bumper surface, a roof surface, a roof rail surface, and a window surface.

In one or more embodiments or examples, the system 500 is configured to provide an instruction indicative of the context data by transmitting an audio control message 514 according to the context data associated with the feature of the surface 508 to a user device 504. In one or more embodiments or examples, the system 500 is configured to transmit an audio control message 514 by transmitting audio data or an audio data identifier. The audio data and/or an audio data identifier can be indicative of or includes an audio message, such as a speech message 512 to be output to the user 506 from the user device 504. In one or more embodiments or examples, the data transmitted by the wireless transceiver is processed by the AV compute 540 prior to transmission. In some examples, the wireless transceiver is located on the exterior or interior of the autonomous vehicle 502.

In one or more embodiments or examples, the audio control message 514 includes information indicative of the feature of the surface 508 of the autonomous vehicle 502. In some examples, the system is configured to transmit the audio control message 514 by transmitting audio data. In one or more embodiments or examples, the system 500 is configured to transmit the audio data as one or more of the following file types: MP3, MP4, M4A, WAV, WMA, AAC, FLAC and/or 3GA. In some examples, the system 500 is configured to transmit the audio control message 514 by transmitting an audio data identifier. An audio data identifier may be advantageous in that the user device 504 may retrieve audio data/instruction already stored in the user device 504 based on the audio data identifier, thereby reducing the amount of data transmitted from the autonomous vehicle 502.

In one or more embodiments or examples, the system 500 is configured to determine an instruction indicative of the context data based on the audio data identifier. In some examples, the audio data identifier is a label, an address and/or a number. In one or more embodiments or examples, the system 500 is configured to provide an instruction indicative of the context data by providing the instruction based on an operating status of the autonomous vehicle 502. In one or more embodiments or examples, the operating status is associated with whether the autonomous vehicle 502 is locked or unlocked. For example, the system 500 is configured such that if user 506 touches the door handle of the locked autonomous vehicle 502 then, based on the operating status indicative of the autonomous vehicle 502 being locked, the locked autonomous vehicle 502 provides an instruction informing the user 506 to unlock the autonomous vehicle 502, such as shown in FIG. 5C. In some examples, this instruction to unlock the autonomous vehicle 502 includes information indicative of how to unlock the autonomous vehicle 502, e.g. "please unlock using your phone".

In one or more embodiments or examples, the system 500 is configured to detect a user input at or on a surface 508 of an autonomous vehicle 502 by detecting that a user 506 of the autonomous vehicle 502 is within a predetermined range of the autonomous vehicle 502. In one or more embodiments or examples, the context data associated with the feature of the surface 508 is determined, e.g., generated, based on detecting that the user 506 is within the predetermined range of the autonomous vehicle 502. In other words, determining the context data can be based on detecting that the user 506 is within the predetermined range of the autonomous vehicle 502. In some examples, the predetermined range is an area around the autonomous vehicle 502, where a user 506 outside of the area is outside of the predetermined range. For example, if the user 506 is outside of the predetermined range, the autonomous vehicle 502 will not provide an instruction. In one or more embodiments or examples, the system 500 is configured to transmit and/or receive short range communication (e.g., Bluetooth and/or NFC) for detection of whether the user 506 is within the predetermined range) As an example, the user device 504 sends periodic short range communication signals (e.g., messages) that the system 500 is configured to receive. Alternatively, the system 500 can transmit a signal to a user device 504 and the system 500 can receive a response signal from the user device 504. In some examples, information indicative of the predetermined range is provided to the user 506 via the user device 504. In some examples, the user 506 is notified, e.g. via the user device 504, when they have entered the predetermined range. For example, this allows the user 506 to know when they are at the intended autonomous vehicle 502 without needing to touch the autonomous vehicle 502, therefore mitigating the risk of the user 506 touching unintended vehicles.

As discussed, in certain implementations the autonomous vehicle 502 includes potential different sensors. In one or more embodiments or examples, the sensor (e.g., a first sensor) includes a touch sensor, such as touch sensors 202*i* of FIG. 2, and detecting a user input includes detecting a touch on the surface 508 with the touch sensor. In some embodiments, the touch sensor is an impedance sensor, a capacitive sensor, a proximity sensor, and/or a resistive sensor. In one or more embodiments or examples, the system 500 is configured to require some force to be applied by the user 506 on the surface 508 to trigger the resistive sensors. In one or more embodiments or examples, a certain threshold is set for the capacitive sensors to lower false-positive interactions (e.g. to account for rain, leaves and/or other foreign bodies potentially causing the capacitive sensor to trigger and send a signal to the AV compute 540). In one or more embodiments or examples, the system 500 is configured to detect a user input by detecting proximity of a user 506 at the surface 508 with the proximity sensor. In some embodiments, the proximity sensor is a camera, such as cameras 202*a* of FIG. 2, and/or a motion sensor. In some embodiments, the proximity sensors are configured to detect gestures carried out by the user 506.

In one or more embodiments or examples, the system 500 is configured to detect a gesture at or on the surface 508. In one or more embodiments or examples, in accordance with detecting the gesture, the system 500 is configured to determine the context data associated with a feature of the surface 508 based on the gesture. In one or more embodiments or examples, the gesture includes touching the surface 508 and/or the second surface. In some examples, the AV compute 540 is configured to detect a gesture using at least one or more sensors, such as cameras 202*a* and/or touch sensors 202*i*. In one or more embodiments or examples, the gesture includes tapping the surface 508 a specific number of times in succession. In some examples, the system 500 is configured to detect at least one or more consecutive taps on the surface 508. As an example, the system 500 is configured such that the user 506 triple taps the surface 508 for an audio message describing their surroundings. In some examples, the user 506 double taps the surface 508 to request that the autonomous vehicle 502 provides an instruction associated with the context data. For example, the user 506 double taps the door handle to request further instructions and an audible message would be played from the autonomous vehicle 502 and/or the user device 504 recommending a next action the user 506 should take. An example of the audible message is "to open the door grasp the door handle and pull towards yourself". In some examples, the gesture includes the user 506, within the predetermined range, moving their body in a specific manner (e.g. wave, point, raise arm). For example, the gesture includes a user 506 moving their hand across a portion (e.g., surface 508) of the autonomous vehicle. In other words, the gesture can be construed as a user 506 moving their hand from right to left and/or vice versa along the side (e.g., surface 508) of the autonomous vehicle 502. In some examples, this movement is then detected by the proximity sensors and then processed using the at least one processor. In some embodiments, a database includes stored gestures, each of which are associated with a request for information by the user 506. For example, the user 506 points at the door handle of the autonomous vehicle 502 and a speech message 512 describing how to operate the door handle would be provided.

In one or more examples or embodiments, the system 500 is configured to control operation by generating control data for a control system of an autonomous vehicle 502. For example, the system 500 is configured to provide (e.g., transmit) control data to a control system (such as control system 408 of FIG. 4) of an autonomous vehicle 502 and/or an external system.

FIG. 5A shows an example scenario, where the user device 504 transmits 510 data associated with a user profile 511 to the AV Compute 540 of the autonomous vehicle 502. The user profile 511 includes a user identifier and/or user settings associated with the user 506.

Figure 5B:
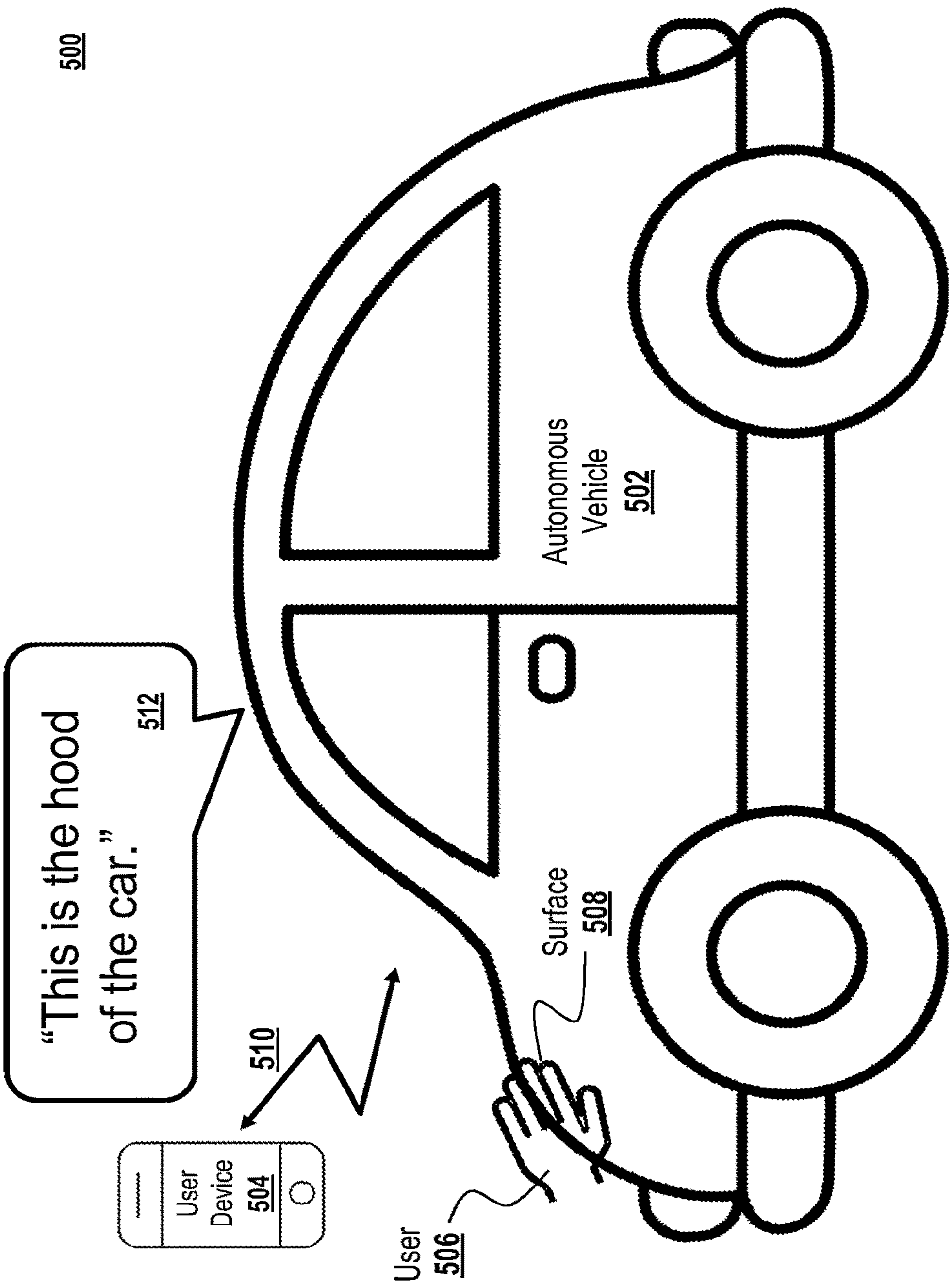
Figure 5C:
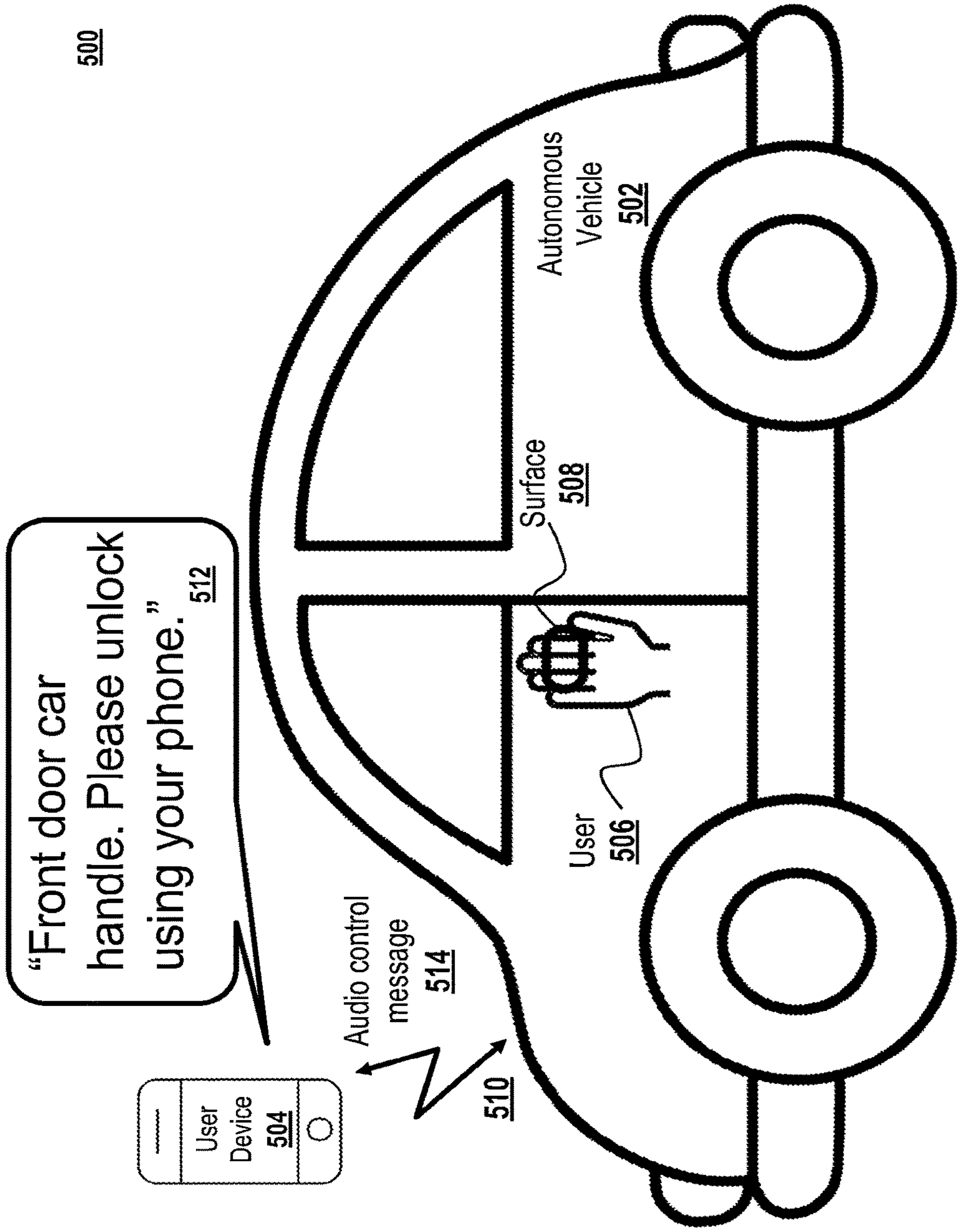
Figure 5D:
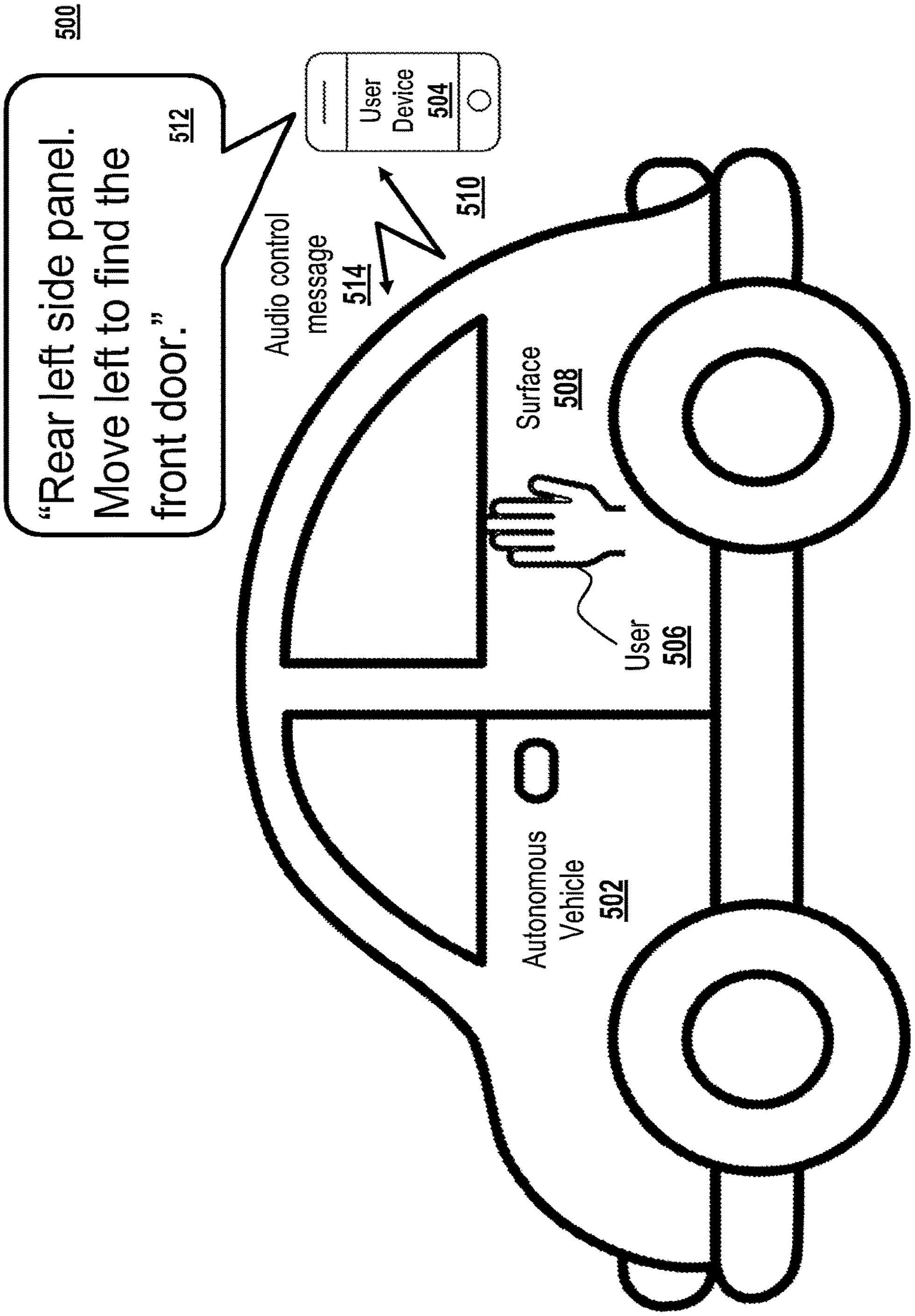
Figure 5E:
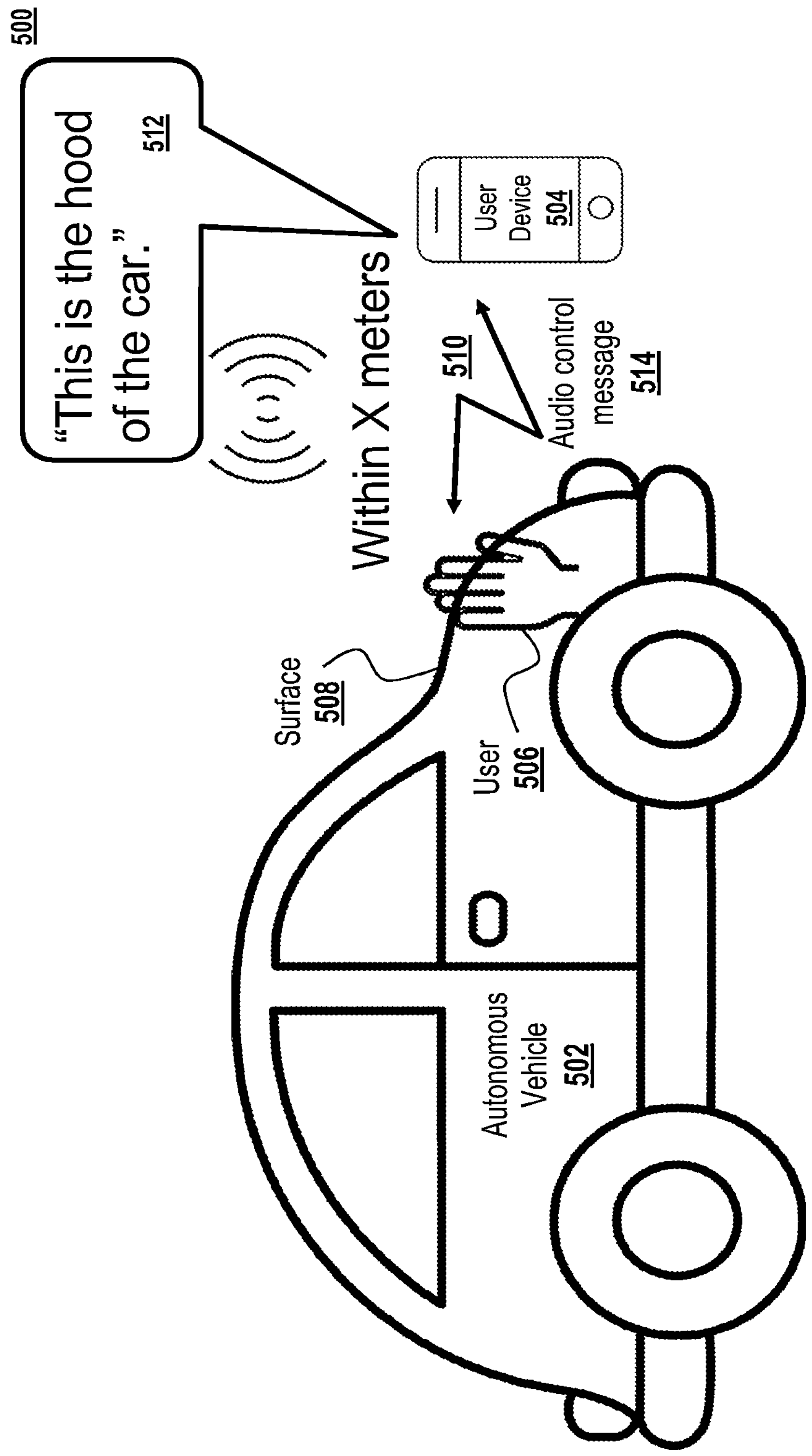

FIG. 5B shows an example scenario with a user input by a user 506 at surface 508 (e.g., first surface). As shown in this example, the surface 508 is a hood of the autonomous vehicle 502. The system 500 can be configured to detect the user input and, using the AV compute 540, provide a speech message 512 via a loudspeaker of the autonomous vehicle 502. FIG. 5B shows wireless communication between the user device 504 and the autonomous vehicle 502. In some examples, this wireless communication includes transmitting data associated with a user profile 511 (e.g., between the autonomous vehicle 502 and the user device 504 and/or between the autonomous vehicle 502 and an external server and/or between the user device 504 and an external server). In some examples, the user profile 511 includes information indicative of whether the autonomous vehicle 502 should provide audio feedback, such as a speech message 512, to the user. In some examples, the user input is a gesture where the user 506 does not physically touch surface 508. In some examples, the user input is a gesture where the user 506 is physically touching surface 508. In one or more examples, determining context data associated with a feature of the first surface is performed in accordance with a determination that a criterion is satisfied and forgo determining context data associated with a feature of the first surface in accordance with a determination that a criterion is not satisfied. The criterion can be based on the user profile 511, such as user identifier and/or user settings of the user profile, and/or a distance between the user device 504 and the autonomous vehicle 502. In other words, the system 500 can be configured to only determine context data and transmit an instruction to users that are in need of the instructions, e.g., as indicated by the user profile 511 and/or a distance between the user device 504 and the autonomous vehicle 502. The user 506 touches the surface 508 (e.g., the hood of the AV 502) and the system 500 determines context data ("This is the hood of the car") associated with a feature ("hood") of the surface 508. The system 500 provides an instruction associated with the context data by playing an audio message, e.g., speech message 512 ("This is the hood of the car").

FIG. 5C shows an example scenario with a user input by the user 506 at surface 508. In this example, the surface 508 is a door handle of a front door. The system 500 can be configured to detect the user input. The system 500 determines context data in accordance with the detected user input and user profile 511 transmitted to the system from user device 504, and provides an instruction associated with the context data by transmitting an audio control message 514 to the user device 504 providing a speech message 512 in accordance with the audio control message 514. In some examples, the user device 504 provides the speech message 512 via a loudspeaker and/or headphones/earphones. FIG. 5C shows wireless communication between the user device 504 and the autonomous vehicle 502. In some examples, this wireless communication includes transmitting data associated with a user profile 511. The user profile 511 can include information indicative of whether the autonomous vehicle 502 should provide a speech message 512.

FIG. 5D shows an example scenario with a user input by the user 506 at surface 508. In this example, the surface 508 is a rear left side panel of the autonomous vehicle 502. The system 500 can be configured to detect the user input. FIG. 5D shows an example where the autonomous vehicle 502 transmits an audio control message 514 to the user device 504. In some examples, the user device 504 provides the speech message 512 via a loudspeaker and/or headphones/earphones in accordance with the audio control message 514. The speech message 512 optionally includes directional information indicative of a direction for the user 506 to move and/or a feature of a second surface being the front door. FIG. 5D shows wireless communication between the user device 504 and the autonomous vehicle 502. In some examples, this wireless communication includes transmitting 510 data associated with a user profile 511. The user profile 511 can include information indicative of whether the autonomous vehicle 502 should provide a speech message 512. In FIG. 5D, the speech message 512 includes directional information, indicative of a direction for the user 506 to move.

FIG. 5E shows an example scenario with a user input by the user 506 at surface 508. In this example, the surface 508 is a hood of the autonomous vehicle 502. The system 500 of FIG. 5E is configured to detect the user input. FIG. 5E shows an example where the system 500 determines whether a criterion based on user profile 511, such as user identifier and/or user settings of the user profile, and/or a distance between the user device 504 and the autonomous vehicle 502 is satisfied. In one or more examples, the criterion is satisfied if the user profile 511 is associated with the autonomous vehicle 502, e.g. via ownership or an order for a ride, and the distance between the user device 504 and the autonomous vehicle 502 does not satisfy (e.g., is less than) a threshold, e.g. less than 5 meters or even less than 3 meters or less than 1 meter. In accordance with a determination that the criterion is satisfied as illustrated, the system 500 proceeds to determine context data ("this is the hood of the car") associated with a feature ("hood") of the first surface and providing an instruction associated with the context data by transmitting an audio control message 514 to the user device 504. In some examples, the user device 504 provides the speech message 512 via a loudspeaker and/or headphones/earphones connected to the user device 504. FIG. 5E shows wireless communication between the user device 504 and the autonomous vehicle 502. In some examples, this wireless communication includes transmitting 510 data associated with a user profile 511. The user profile 511 can include information indicative of whether the autonomous vehicle 502 should provide a speech message 512 and which information to include in the speech message. In some examples, the wireless communication shown in FIG. 5E between the user device 504 and the autonomous vehicle 502 includes short range communication (e.g. Bluetooth and/or NFC). In some examples whether a speech message 512 is provided by the user device 504 depends on whether the user device 504 is within the predetermined range of the autonomous vehicle 502, e.g., whether a criterion is satisfied. In one or more embodiments or examples, a detection of whether the user 506 is within the predetermined range or distance includes or is based on short range communication (e.g. Bluetooth and/or NFC).

Figure 5F:
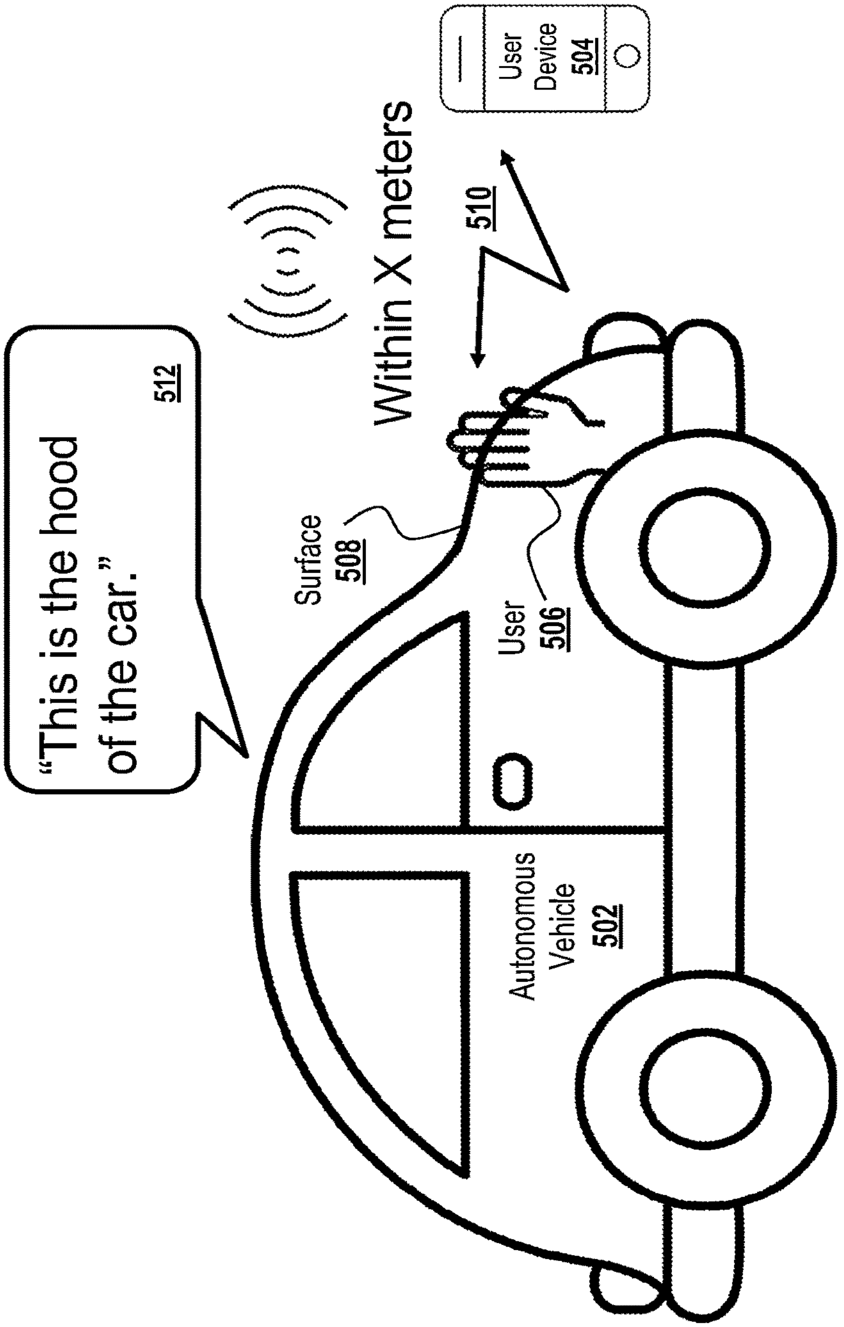
Figure 5G:
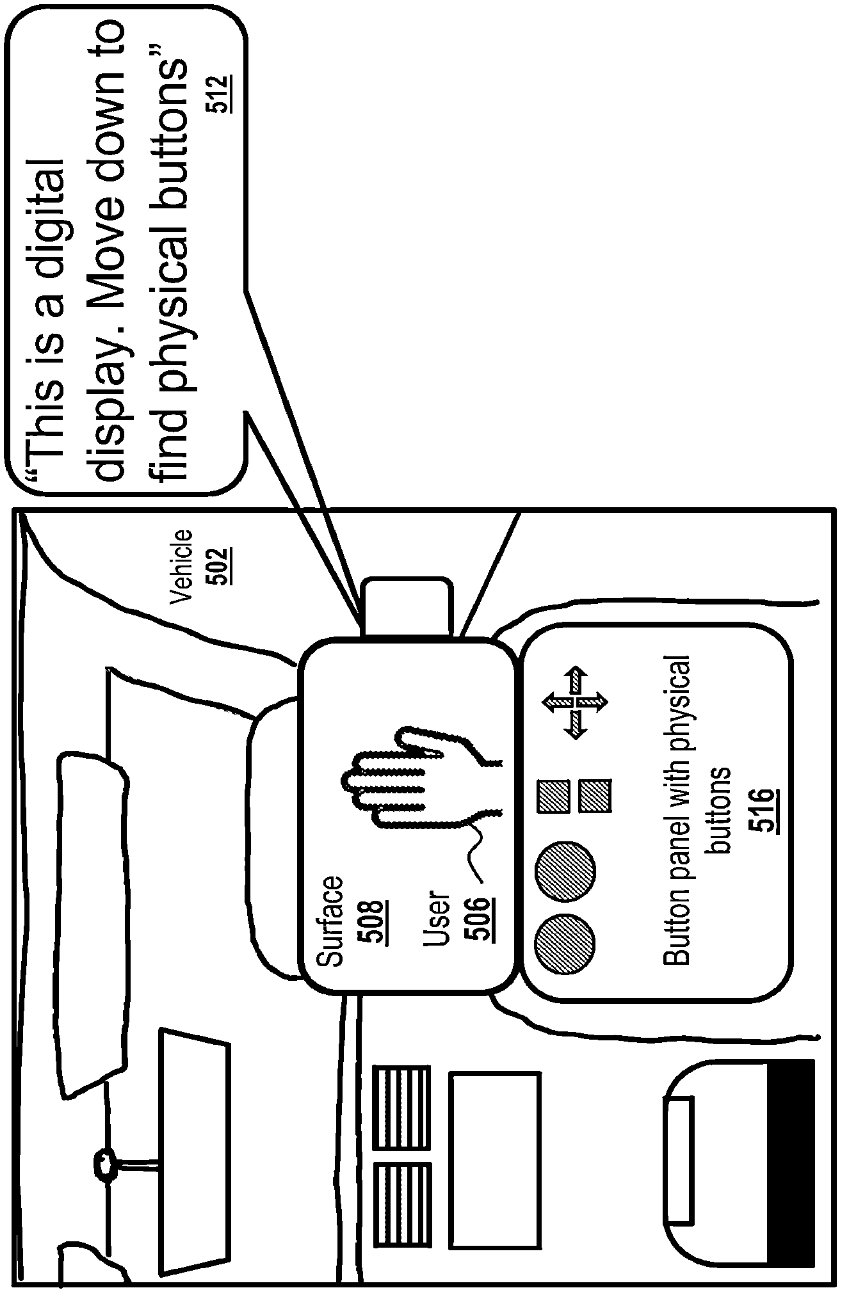

FIG. 5F shows an example scenario corresponding to the scenario of FIG. 5E except that the system 500 plays, via a loudspeaker of the autonomous vehicle 502, the speech message 512.

FIG. 5G shows an example scenario where a user input by the user 506 at surface 508 is provided to an internal surface of the autonomous vehicle 502, such as a digital display or touch screen. FIG. 5G shows an example where the system 500 provides a speech message 512 including directional information indicative of a direction for the user 506 to move in. In FIG. 5G, the speech message 512 includes directional instructions for the user 506 to locate a second surface being the button panel with physical buttons 516.

Referring now to FIG. 6, illustrated is a flowchart of a method or process 600 for autonomous vehicle and audio user guidance such as for operating and/or controlling an AV. The method can be performed by a system disclosed herein, such as an AV compute **202*f* of FIG. 2 and AV compute 400 of FIG. 4, a vehicle 102, 200, of FIGS. 1 and 2, respectively, device 300 of FIG. 3, AV compute 540 of FIG. 5A, and implementations of FIG. 5B-5G. The system disclosed can include at least one processor which can be configured to carry out one or more of the operations of method 600. The method 600** can be performed (e.g., completely, partially, and/or the like) by another device or group of devices separate from or including system disclosed herein.

A method 600 is disclosed. The method 600 includes detecting, at step S602, using a first sensor and at least one processor, a user input at or on a first surface of an autonomous vehicle. The method 600 includes, in accordance with a detection of the user input at or on the first surface, determining, at step S604 context data associated with a feature of the first surface using the at least one processor. The method 600 includes providing, at step S606 an instruction indicative of the context data via an interface and using the at least one processor. In some examples, the method 600 is a method for operating an autonomous vehicle. In some examples, the instruction includes information describing how to enter and/or exit the autonomous vehicle 502.

In one or more embodiments or examples, the method 600 includes determining context data associated with a feature of a second surface in accordance with the detection of the user input at or on the first surface. In one or more embodiments or examples, the context data associated with a feature of the first surface and/or second surface is a user guidance scheme indicative of user guidance associated with the user input at or on the first surface.

In one or more embodiments or examples, the method 600 includes obtaining a user profile. In one or more embodiments or examples, determining, at step S604, context data associated with a feature of the first surface includes determining the user guidance scheme based on the user profile. In one or more embodiments or examples, the user profile includes one or more of a user identifier and user settings. In one or more embodiments or examples, determining, at step S604, context data associated with a feature of the first surface includes determining the user guidance scheme based on one or more of the user identifier and the user settings. In one or more embodiments or examples, the user settings include an accessibility setting of the user, the accessibility setting being indicative of the user's accessibility to the autonomous vehicle.

In one or more embodiments or examples, the method 600 includes obtaining, via the at least one interface, the user profile from a user device associated with the user via short range communication. In one or more embodiments or examples, the context data associated with a feature of the first surface includes a context data identifier indicative of context associated with the feature of the first surface.

In one or more embodiments or examples, the first surface is an outer surface of the autonomous vehicle selected from a hood surface, a trunk surface, a door surface, a door handle surface, a mirror surface, a quarter panel surface, a bumper surface, a roof surface, a roof rail surface, and a window surface. In one or more embodiments or examples, the first surface is an inner surface of the autonomous vehicle selected from a screen surface, a seat surface, a door surface, a door handle surface, and a window surface.

In one or more embodiments or examples, providing, at step S606, an instruction indicative of the context data includes providing audio data associated with an audio message according to the context data associated with the feature of the first surface. In one or more embodiments or examples, the audio data is configured to cause a loudspeaker to generate an audible signal based on the audio message. In one or more embodiments or examples, providing audio data associated with an audio message according to the context data associated with the feature of the first surface includes providing speech data associated with a speech message according to the context data associated with the feature of the first surface. In one or more embodiments or examples, the speech data is configured to cause a loudspeaker to generate an audible signal based on the speech message.

In one or more embodiments or examples, providing, at step S606, an instruction indicative of the context data includes transmitting, with a wireless transceiver, an audio control message according to the context data associated with the feature of the first surface to a user device. In one or more embodiments or examples, transmitting an audio control message includes transmitting audio data or an audio data identifier. In one or more embodiments or examples, providing, at step S606, an instruction indicative of the context data includes providing the instruction based on an operating status of the autonomous vehicle.

In one or more embodiments or examples, detecting a user input at or on a first surface of an autonomous vehicle includes detecting that a user of the autonomous vehicle is within a predetermined range of the autonomous vehicle. Detecting whether the user is within the predetermined range is, for example, determined using short range communication, such as Bluetooth or NFC). In one or more embodiments or examples, the context data associated with the feature of the first surface is based on detecting that the user is within the predetermined range of the autonomous vehicle.

In one or more embodiments or examples, the first sensor includes a touch sensor and detecting a user input includes detecting a touch on the first surface with the touch sensor. In one or more embodiments or examples, the first sensor includes a proximity sensor. In one or more embodiments or examples, detecting a user input includes detecting proximity of a user at the first surface with the proximity sensor. In some examples the method 600 includes using the first sensor to produce signals based on the user input, which are then relayed to the AV compute.

In one or more embodiments or examples, the method 600 includes detecting a gesture at or on the first surface, and in accordance with detecting the gesture, determining the context data associated with a feature of the first surface based on the gesture. In some embodiments or examples, in accordance with not detecting the gesture, the method 600 includes not determining the context data associated with a feature of the first surface based on the gesture.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

Disclosed are non-transitory computer readable media comprising instructions stored thereon that, when executed by at least one processor, cause the at least one processor to carry out operations according to one or more of the methods disclosed herein.

Also disclosed are methods, non-transitory computer readable media, and systems according to any of the following items:

Item 1. A system comprising:

at least one processor;

and at least one non-transitory computer readable medium storing instructions that, when executed by the at least one processor, cause the at least one processor to perform operations comprising:

detecting, using a first sensor, a user input at or on a first surface of an autonomous vehicle;

in accordance with a detection of the user input at or on the first surface, determining context data associated with a feature of the first surface; and providing, via at least one interface, an instruction associated with the context data.

Item 2. The system according to item 1, the operations comprising:

in accordance with the detection of the user input at or on the first surface, determining second context data associated with a feature of a second surface.

Item 3. The system according to item 1 or 2, wherein the context data associated with the feature of the first surface and/or second surface is a user guidance scheme indicative of user guidance associated with the user input at or on the first surface.

Item 4. The system according to item 3, the operations comprising:

obtaining a user profile, and wherein determining context data associated with a feature of the first surface comprises:

determining the user guidance scheme based on the user profile.

Item 5. The system according to item 4, wherein the user profile comprises one or more of a user identifier and user settings, and wherein determining context data associated with the feature of the first surface comprises:

determining the user guidance scheme based on one or more of the user identifier and the user settings.

Item 6. The system according to item 5, wherein the user settings comprise an accessibility setting of the user, the accessibility setting being indicative of the user's accessibility to the autonomous vehicle.

Item 7. The system according to any one of items 4-6, the operations comprising:

Obtaining the user profile from a user device associated with the user via short range communication.

Item 8. The system according to any one of items 3-7, wherein the context data associated with the feature of the first surface comprises a context data identifier indicative of context associated with the feature of the first surface.

Item 9. The system according to any one of the previous items, wherein the first surface is an outer surface of the autonomous vehicle selected from a hood surface, a trunk surface, a door surface, a door handle surface, a mirror surface, a quarter panel surface, a bumper surface, a roof surface, a roof rail surface, and a window surface.

Item 10. The system according to any one of items 1-8, wherein the first surface is an inner surface of the autonomous vehicle selected from a screen surface, a seat surface, a door surface, a door handle surface, and a window surface.

Item 11. The system according to any one of the previous items, wherein providing an instruction indicative of the context data comprises:

providing audio data associated with an audio message according to the context data associated with the feature of the first surface, the audio data configured to cause a loudspeaker to generate an audible signal based on the audio message.

Item 12. The system according to item 11, wherein providing audio data associated with an audio message according to the context data associated with the feature of the first surface comprises:

providing speech data associated with a speech message according to the context data associated with the feature of the first surface, the speech data configured to cause a loudspeaker to generate an audible signal based on the speech message.

Item 13. The system according to any one of the previous items, wherein providing an instruction indicative of the context data comprises transmitting, with a wireless transceiver, an audio control message according to the context data associated with the feature of the first surface to a user device, wherein transmitting the audio control message comprises transmitting audio data or an audio data identifier.

Item 14. The system according to any one of the previous items, wherein providing an instruction indicative of the context data comprises:

providing the instruction based on an operating status of the autonomous vehicle.

Item 15. The system according to any one of the previous items, wherein detecting a user input at or on a first surface of an autonomous vehicle comprises detecting that a user of the autonomous vehicle is within a predetermined range of the autonomous vehicle.

Item 16. The system according to item 15, wherein determining the context data associated with the feature of the first surface is based on detecting that the user is within the predetermined range of the autonomous vehicle.

Item 17. The system according to any one of the previous items, wherein the first sensor comprises a touch sensor and wherein detecting a user input comprises detecting a touch on the first surface with the touch sensor; and/or the first sensor comprises a proximity sensor and wherein detecting a user input comprises detecting proximity of a user at the first surface with the proximity sensor.

Item 18. The system according to any one of the previous items, the operations comprising:

detecting a gesture at or on the first surface, and in accordance with detecting the gesture, determining the context data associated with a feature of the first surface based on the gesture.

Item 19. A method; comprising:

detecting, using at least one processor, a user input at or on a first surface of an autonomous vehicle;

in accordance with a detection of the user input at or on the first surface, determining, using the at least one processor, context data associated with a feature of the first surface; and providing, via an interface and using the at least one processor, an instruction indicative of the context data.

Item 20. The method according to item 19, the method comprising:

in accordance with the detection of the user input at or on the first surface, determining context data associated with a feature of a second surface.

Item 21. The method according to item 19 or 20, wherein the context data associated with a feature of the first surface and/or second surface is a user guidance scheme indicative of user guidance associated with the user input at or on the first surface.

Item 22. The method according to item 21, the method comprising:

obtaining a user profile, and wherein determining the context data associated with the feature of the first surface comprises:

determining the user guidance scheme based on the user profile.

Item 23. The method according to item 22, wherein the user profile comprises one or more of a user identifier and user settings, and wherein determining the context data associated with the feature of the first surface comprises:

determining the user guidance scheme based on one or more of the user identifier and the user settings.

Item 24. The method according to item 23, wherein the user settings comprise an accessibility setting of the user, the accessibility setting being indicative of the user's accessibility to the autonomous vehicle.

Item 25. The method according to any one of items 22-24, the method comprising: obtaining the user profile from a user device associated with the user via short range communication.

Item 26. The method according to any one of items 21-25, wherein the context data associated with the feature of the first surface comprises a context data identifier indicative of context associated with the feature of the first surface.

Item 27. The method according to any one of items 19-26, wherein the first surface is an outer surface of the autonomous vehicle selected from a hood surface, a trunk surface, a door surface, a door handle surface, a mirror surface, a quarter panel surface, a bumper surface, a roof surface, a roof rail surface, and a window surface.

Item 28. The method according to any one of items 19-26, wherein the first surface is an inner surface of the autonomous vehicle selected from a screen surface, a seat surface, a door surface, a door handle surface, and a window surface.

Item 29. The method according to any one of items 19-28, wherein providing an instruction indicative of the context data comprises:

providing audio data associated with an audio message according to the context data associated with the feature of the first surface, the audio data configured to cause a loudspeaker to generate an audible signal based on the audio message.

Item 30. The method according to item 29, wherein providing audio data associated with an audio message according to the context data associated with the feature of the first surface comprises:

providing speech data associated with a speech message according to the context data associated with the feature of the first surface, the speech data configured to cause a loudspeaker to generate an audible signal based on the speech message.

Item 31. The method according to any one of items 19-30, wherein providing an instruction indicative of the context data comprises transmitting, with a wireless transceiver, an audio control message according to the context data associated with the feature of the first surface to a user device, wherein transmitting the audio control message comprises transmitting audio data or an audio data identifier.

Item 32. The method according to any one of items 19-31, wherein providing an instruction indicative of the context data comprises:

providing the instruction based on an operating status of the autonomous vehicle.

Item 33. The method according to any one of items 19-32, wherein detecting a user input at or on a first surface of an autonomous vehicle comprises detecting that a user of the autonomous vehicle is within a predetermined range of the autonomous vehicle.

Item 34. The method according to item 33, wherein determining the context data associated with the feature of the first surface is based on detecting that the user is within the predetermined range of the autonomous vehicle.

Item 35. The method according to any one of items 19-34, wherein the first sensor comprises a touch sensor and wherein detecting a user input comprises detecting a touch on the first surface with the touch sensor; or the first sensor comprises a proximity sensor and wherein detecting a user input comprises detecting proximity of a user at the first surface with the proximity sensor.

Item 36. The method according to any one of items 19-35, the method comprising:

detecting a gesture at or on the first surface, and in accordance with detecting the gesture, determining the context data associated with a feature of the first surface based on the gesture.

Item 37. A non-transitory computer readable medium comprising instructions stored thereon that, when executed by at least one processor, cause the at least one processor to carry out operations comprising:

detecting, using a first sensor, a user input at or on a first surface of an autonomous vehicle;

in accordance with a detection of the user input at or on the first surface, determining context data associated with a feature of the first surface; and providing, via an interface, an instruction indicative of the context data.

Item 38. The non-transitory computer readable medium according to item 37, the operations comprising:

in accordance with the detection of the user input at or on the first surface, determining second context data associated with a feature of a second surface.

Item 39. The non-transitory computer readable medium according to item 37 or 38, wherein the context data associated with the feature of the first surface and/or second surface is a user guidance scheme indicative of user guidance associated with the user input at or on the first surface.

Item 40. The non-transitory computer readable medium according to item 39, the operations comprising:

obtaining a user profile, and wherein determining the context data associated with the feature of the first surface comprises:

determining the user guidance scheme based on the user profile.

Item 41. The non-transitory computer readable medium according to item 40, wherein the user profile comprises one or more of a user identifier and user settings, and wherein determining the context data associated with the feature of the first surface comprises:

determining the user guidance scheme based on one or more of the user identifier and the user settings.

Item 42. The non-transitory computer readable medium according to item 41, wherein the user settings comprise an accessibility setting of the user, the accessibility setting being indicative of the user's accessibility to the autonomous vehicle.

Item 43. The non-transitory computer readable medium according to any one of items 40-42, the operations comprising:

Obtaining the user profile from a user device associated with the user via short range communication.

Item 44. The non-transitory computer readable medium according to any one of items 39-43, wherein the context data associated with the feature of the first surface comprises a context data identifier indicative of context associated with the feature of the first surface.

Item 45. The non-transitory computer readable medium according to any one of the previous items, wherein the first surface is an outer surface of the autonomous vehicle selected from a hood surface, a trunk surface, a door surface, a door handle surface, a mirror surface, a quarter panel surface, a bumper surface, a roof surface, a roof rail surface, and a window surface.

Item 46. The non-transitory computer readable medium according to any one of items 37-44, wherein the first surface is an inner surface of the autonomous vehicle selected from a screen surface, a seat surface, a door surface, a door handle surface, and a window surface.

Item 47. The non-transitory computer readable medium according to any one of items 37-46, wherein providing an instruction indicative of the context data comprises: providing audio data associated with an audio message according to the context data associated with the feature of the first surface, the audio data configured to cause a loudspeaker to generate an audible signal based on the audio message.

Item 48. The non-transitory computer readable medium according to item 47, wherein providing audio data associated with an audio message according to the context data associated with the feature of the first surface comprises:

providing speech data associated with a speech message according to the context data associated with the feature of the first surface, the speech data configured to cause a loudspeaker to generate an audible signal based on the speech message.

Item 49. The non-transitory computer readable medium according to any one of items 37-48, wherein providing an instruction indicative of the context data comprises transmitting, with a wireless transceiver, an audio control message according to the context data associated with the feature of the first surface to a user device, wherein transmitting the audio control message comprises transmitting audio data or an audio data identifier.

Item 50. The non-transitory computer readable medium according to any one of items 37-49, wherein providing an instruction indicative of the context data comprises:

providing the instruction based on an operating status of the autonomous vehicle.

Item 51. The non-transitory computer readable medium according to any one of items 37-50, wherein detecting a user input at or on a first surface of an autonomous vehicle comprises detecting that a user of the autonomous vehicle is within a predetermined range of the autonomous vehicle.

Item 52. The non-transitory computer readable medium according to item 51, wherein determining the context data associated with the feature of the first surface is based on detecting that the user is within the predetermined range of the autonomous vehicle.

Item 53. The non-transitory computer readable medium according to any one of items 37-52, wherein the first sensor comprises a touch sensor and wherein detecting a user input comprises detecting a touch on the first surface with the touch sensor; or the first sensor comprises a proximity sensor and wherein detecting a user input comprises detecting proximity of a user at the first surface with the proximity sensor.

Item 54. The non-transitory computer readable medium according to any one of items 37-53, the operations comprising:

detecting a gesture at or on the first surface, and in accordance with detecting the gesture, determining the context data associated with a feature of the first surface based on the gesture.

What is claimed is:

1. A system, comprising:

at least one processor; and at least one non-transitory computer readable medium storing instructions that, when executed by the at least one processor, cause the at least one processor to perform operations comprising:

detecting, using a first touch sensor, contact of a user on a first surface of a plurality of surfaces of an autonomous vehicle, wherein the plurality of surfaces includes a hood surface, a trunk surface, a door surface, a quarter panel surface, a bumper surface, and a roof surface;

determining a location of the user relative to an entry point of the autonomous vehicle based at least in part on the detected contact of the user on the first surface;

determining an instruction associated with assisting the user in entering the autonomous vehicle based at least in part on the determined location of the user; and providing, via at least one interface, the instruction to the user.

2. The system according to claim 1, wherein the instruction is a first instruction, the operations further comprising:

responsive to the detected contact of the user on the first surface, determining a second instruction associated with assisting the user based at least in part on a second surface.

3. The system according to claim 1, the operations further comprising:

obtaining a user profile, wherein determining the instruction associated with assisting the user based at least in part on the determined location of the user comprises:

determining the instruction based on the user profile.

4. The system according to claim 3, wherein the user profile comprises one or more of a user identifier and user settings, wherein determining the instruction associated with assisting the user based at least in part on the determined location of the user comprises:

determining the instruction based on one or more of the user identifier and the user settings.

5. The system according to claim 4, wherein the user settings comprise an accessibility setting of the user, the accessibility setting indicative of accessibility of the autonomous vehicle to the user.

6. The system according to claim 3, the operations comprising:

obtaining the user profile from a user device associated with the user via short range communication.

7. The system according to claim 1, wherein the instruction associated with assisting the user based at least in part on the determined location of the user comprises a first surface identifier indicative of the location of the first surface.

8. The system according to claim 1, wherein providing an instruction to the user comprises:

providing audio data associated with an audio message according to the instruction associated with assisting the user based at least in part on the first surface, the audio data configured to cause a loudspeaker to generate an audible signal based on the audio message.

9. The system according to claim 8, wherein providing audio data associated with an audio message according to the instruction associated with assisting the user based at least in part on the first surface comprises:

providing speech data associated with a speech message according to the instruction associated with assisting the user based at least in part on the first surface, the speech data configured to cause a loudspeaker to generate an audible signal based on the speech message.

10. The system according to claim 1, wherein providing an instruction comprises transmitting, with a wireless transceiver, an audio control message according to the instruction associated with assisting the user based at least in part on the first surface to a user device, wherein transmitting the audio control message comprises transmitting audio data or an audio data identifier.

11. The system according to claim 1, wherein providing an instruction comprises:

providing the instruction based on an operating status of the autonomous vehicle.

12. The system according to claim 1, wherein detecting contact of the user comprises:

detecting a gesture at or on the first surface, and in accordance with detecting the gesture, determining the instruction associated with assisting the user based at least in part on the determined location of the user.

13. A method comprising:

detecting, using at least one processor, contact of a user on a first surface of a plurality of surfaces of an autonomous vehicle, wherein the plurality of surfaces includes a hood surface, a trunk surface, a door surface, a quarter panel surface, a bumper surface, and a roof surface;

determining, using the at least one processor, a location of the user relative to an entry point of the autonomous vehicle based at least in part on the detected contact of the user on the first surface;

determining, using the at least one processor, an instruction associated with assisting the user in entering the autonomous vehicle based at least in part on the determined location of the user; and providing, via an interface and using the at least one processor, the instruction to the user.

14. A non-transitory computer readable medium comprising instructions stored thereon that, when executed by at least one processor, cause the at least one processor to carry out operations comprising:

detecting, using a first touch sensor, contact of a user on a first surface of a plurality of surfaces on an autonomous vehicle, wherein the plurality of surfaces includes at least one of a hood surface, a trunk surface, a door surface, a quarter panel surface, a bumper surface, and a roof surface;

determining a location of the user relative to an entry point of the autonomous vehicle based at least in part on the detected contact of the user on the first surface;

determining an instruction associated with assisting the user in entering the autonomous vehicle based at least in part on the determined location of the user; and providing, via an interface, the instruction to the user.

15. The system of claim 1, wherein the first touch sensor is embedded in the first surface.

* * * * *